United States Patent [19]

Lillie

[11] 4,215,955
[45] Aug. 5, 1980

[54] CUTTING TOOL AND INSERT FOR SAME
[75] Inventor: Charles R. Lillie, Rogers, Ark.
[73] Assignee: TRW Inc., Cleveland, Ohio
[21] Appl. No.: 950,380
[22] Filed: Oct. 11, 1978
[51] Int. Cl.³ ............................................. B26D 1/12
[52] U.S. Cl. ...................................... 407/42; 407/49; 407/61
[58] Field of Search ....................... 407/42, 41, 49, 61, 407/62, 53; 408/229, 228

[56] References Cited
U.S. PATENT DOCUMENTS

| 700,736 | 5/1902 | Cadell | 407/49 |
| 1,840,852 | 1/1932 | Schotthoefer | 407/61 |
| 2,207,909 | 7/1940 | Besaw | 407/49 |
| 3,672,017 | 6/1972 | Nielsen et al. | 407/49 |
| 3,861,011 | 1/1975 | Nose et al. | 407/41 |

Primary Examiner—Leonidas Vlachos
Attorney, Agent, or Firm—Daniel G. Blackhurst

[57] ABSTRACT

An insert type end milling cutter and cutting insert for the same which facilitates metal removal. Each insert has a cutting edge which is defined by the intersection of a cutting face and a land area. The cutting face is disposed so as to have a neutral rake angle and the cutting edge itself lies in a single plane but has a generally sinusoidal configuration in a direction normal to the cutting face. The milling cutter includes a plurality of insert locating grooves which locate the inserts in a manner such that the cutting edges form straight helixes over at least a portion of the cutter length. The inserts may be reasonably retained in the locating grooves to facilitate ease of removal for repair or replacement purposes.

5 Claims, 10 Drawing Figures

U.S. Patent  Aug. 5, 1980  Sheet 2 of 2  4,215,955
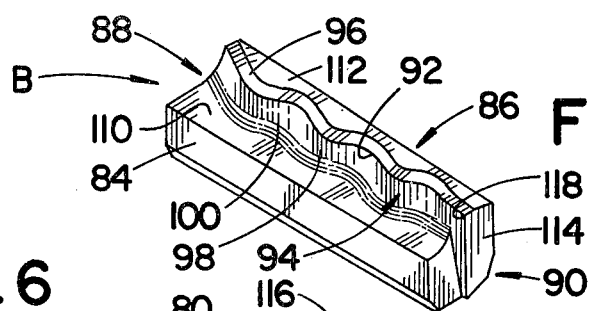
FIG.5
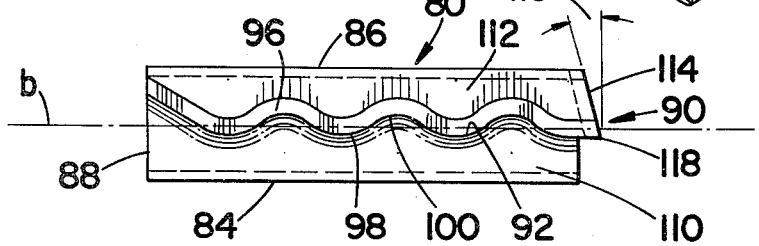
FIG.6
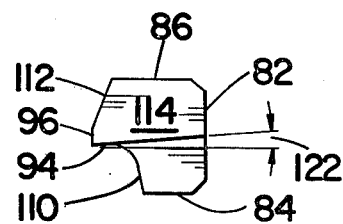
FIG.8
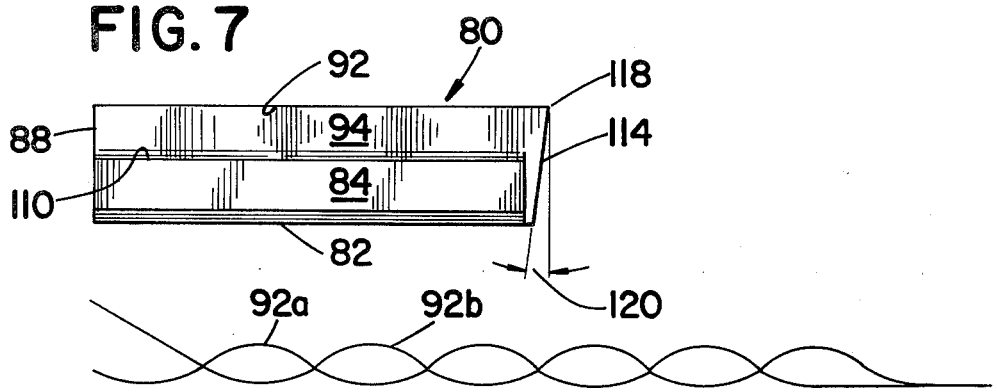
FIG.7
FIG.9
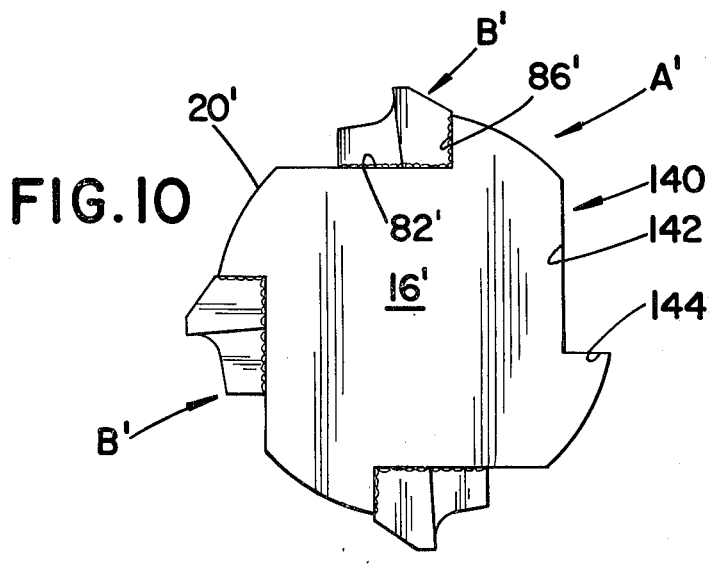
FIG.10

CUTTING TOOL AND INSERT FOR SAME

BACKGROUND OF THE INVENTION

This invention pertains to the art of cutting tools and more particularly to milling cutters.

The invention is particularly applicable to an insert type end mill and will be described with particular reference thereto. However, it will be appreciated that the invention has broader application and may be used or adapted to use with other types of cutters and in other environments where it is desired to perform a material removal operation.

There are many types and styles of end milling cutters adapted to perform different material removal functions. In a typical end mill type a plurality of cutting edges are provided which extend in a spiral or substantially spiral type of helical configuration around the cutter body with corresponding portions of the cutting edges bearing the same relationship to each other over their longitudinal extents. Some cutters have the cutting edges integrally formed on the body of the tool while others have been of the so-called insert type where a plurality of cutting tool inserts are individually affixed to a tool holder. Moreover, the entire length of each cutting edge was exposed to the workpiece at the same time so that the cutting load was continuously distributed over the entire cutting edge length. Because of this construction, the cutting or milling rates attributable to these cutters was dependent upon several factors including, for example, the number of cutting edges, the rotational speed of the cutter and the type of workpiece being processed.

Therefore, it had long been considered desirable to develop a cutting tool which would not be affected by these cutting rate factors to the same extent as conventional cutters and thereby facilitate achieving improved cutting or milling results. To that end, there have been some prior cutter developments which have met these needs and allowed better rough cutting results to be achieved. Perhaps the most successful ones of these improved cutters are those with cutting edges designed to have a generally sinusoidal or undulating configuration radially of the milling cutter. While providing improved results insofar as overall metal removal capabilities were concerned, the basic nature of the sinusoidal or undulating cutting edges is such that a relatively rough workpiece surface finish is obtained. This sometimes necessitated additional finish cutting operations.

These prior cutters also contemplated offsetting the undulations of adjacent cutting edges relative to each other for improving the cutting action, enhancing tool life and, to some degree, improving the surface finish.

Another problem with the aforementioned cutters has been that special grinding equipment was necessary to resharpen them. There have been some prior effects to eliminate these service problems by modifying the cutting edge configuration to allow more conventional resharpening. Even with such modifications, the prior cutters have suffered from those further difficulties and shortcomings noted hereinafter.

More particularly prior efforts to improve end milling cutter capabilities have involved structural arrangements constructed from high speed steel having the cutting edges integrally formed with or machined into the cutter body in a manner forming spiral helixes. High speed steel itself is limited to certain operational speeds which thus places an upper limit on the amount of improved milling results obtainable therefrom. Moreover, damage to a single one of the cutting edges in these prior structures necessitated rebuilding the cutting edge or replacement of the entire cutting tool. Both of these alternatives are time consuming and/or cost prohibitive. Other, minor damage or simple sharpening of the cutting edges required special and relatively expensive equipment which typically was not available in most small shops. Even those designed to render the cutting edges more easily serviceable suffered inherent service problems due to the basic cutting edge configurations and overall cutting tool designs.

It has, therefore, been desirable to develop an arrangement which would not only provide improved stock removal capabilities but would also overcome the aforementioned problems and difficulties. The present invention contemplates a new and improved combination and article which meet the aforementioned needs and provides a new and improved cutting tool and insert for same which is simple, economical in design and manufacture, provides substantially improved stock removal capabilities, has separate replaceable cutting edges and is readily adapted to many uses in different environments.

BRIEF DESCRIPTION OF THE INVENTION

In accordance with the present invention, a cutting tool assembly is provided comprised of a tool body and a plurality of cutting tool inserts affixed thereto at spaced intervals therearound. The tool body has a mounting portion adapted for mounting in conventional chuck means for rotation about its longitudinal axis. A cylindrical tool holder portion is disposed axially adjacent the mounting portion and terminates in an outermost end. The cutting tool inserts are affixed to the tool holder portion in a manner such that a cutting edge on each insert is spaced radially outward of the tool holder portion over a longitudinal section thereof. Each cutting edge is defined by the intersection of an insert cutting face establishing a rake angle and a land area tapering from the cutting edge toward an insert bottom surface. The cutting face includes a plurality of alternative arcuate peak and valley areas for defining a generally sinusoidal cutting edge configuration along the cutting face surface. The cutting edge also has a substantially straight line configuration as viewed in a direction normal to the cutting face. Means are provided for precisely locating each of the tool inserts at the desired spaced apart intervals such that the insert cutting edges are disposed in straight helixes relative to the tool holder longitudinal axis. Means are also provided for fixedly retaining each of the tool inserts in the located position.

In accordance with another aspect of the present invention, the locating means in the holder portion is comprised of a plurality of spaced insert receiving grooves with each groove having a bottom wall and at least one side wall. Each receiving groove is adapted to receive one of the inserts with the bottom surface thereof engaging the groove bottom wall and one of the insert side faces engaging at least one groove side wall for locating the associated insert in a desired radial and longitudinal disposition on the holder portion.

In accordance with another aspect of the present invention, the retaining means comprises wedge means associated with each of the insert receiving grooves. Each wedge means has a wedge surface selectively movable into and out of a wedging relationship with the associated tool insert. The action of the wedge surface is such that the bottom surface and the one insert side face are forced toward positive engagement with the groove bottom and at least one side wall, respectively.

In accordance with another aspect of the present invention, a cutting insert is provided which is adapted for mounting on the holder portion of the tool body. The insert is comprised of a body having a longitudinal axis, a substantially flat bottom surface and a cutting edge extending generally longitudinally of the bottom surface. The cutting face is disposed to have a neutral rake angle when the insert is installed on a tool holder. The cutting face also includes a plurality of alternating arcuate peak areas extending outwardly therefrom and arcuate valley areas extending inwardly thereinto laterally thereacross for defining the generally sinusoidal cutting edge configuration in the surface of the cutting face. The peak areas at least at the cutting edge area have a radius greater than the valley areas.

In accordance with a more limited aspect of the present invention, the cutting face and cutting edge extend axially outward from the insert body at one of the opposite end areas.

In accordance with another aspect of the present invention, the tool inserts are constructed from carbide and the alternating arcuate peak and valley areas in the cutting face of each tool insert are offset along the insert longitudinal axis relative to the peak and valley areas of those adjacent tool inserts mounted to the tool holder portion.

The principal object of the present invention is the provision of a new and improved cutting tool and insert for same which facilitates improved cutting or material removal rates.

Another object of the present invention is the provision of a new and improved cutting tool and insert for same which allows individual inserts to be selectively removed for maintenance, adjustment or replacement purposes.

Still another object of the present invention is the provision of a new and improved cutting tool and insert for same which can be operated at substantially greater cutting speeds than prior cutting tools of the particular type to which the invention is directed.

A further object of a present invention is the provision of a new and improved cutting tool insert having an improved cutting edge and which insert is easy to manufacture by conventional techniques.

Other objects and advantages will become apparent to those skilled in the art upon a reading and understanding of the following specification.

BRIEF DESCRIPTION OF THE DRAWINGS

The invention may take physical form in certain parts and arrangements of parts, a preferred and alternative embodiments of which will be described in detail in the specification and illustrated in the accompanying drawings which form a part hereof and wherein:

FIG. 5 is a perspective view of a tool insert which forms a part of the present invention;

FIGS. 6-8 are plan, front and end views, respectively, of the tool insert shown in FIG. 5;

FIG. 9 is a schematic plan view showing an alternative relationship between adjacent insert cutting edges; and, FIG. 10 is an end view of an alternative tool holder structure.

DETAILED DESCRIPTION OF THE PREFERRED AND ALTERNATIVE EMBODIMENTS

Figure 1:
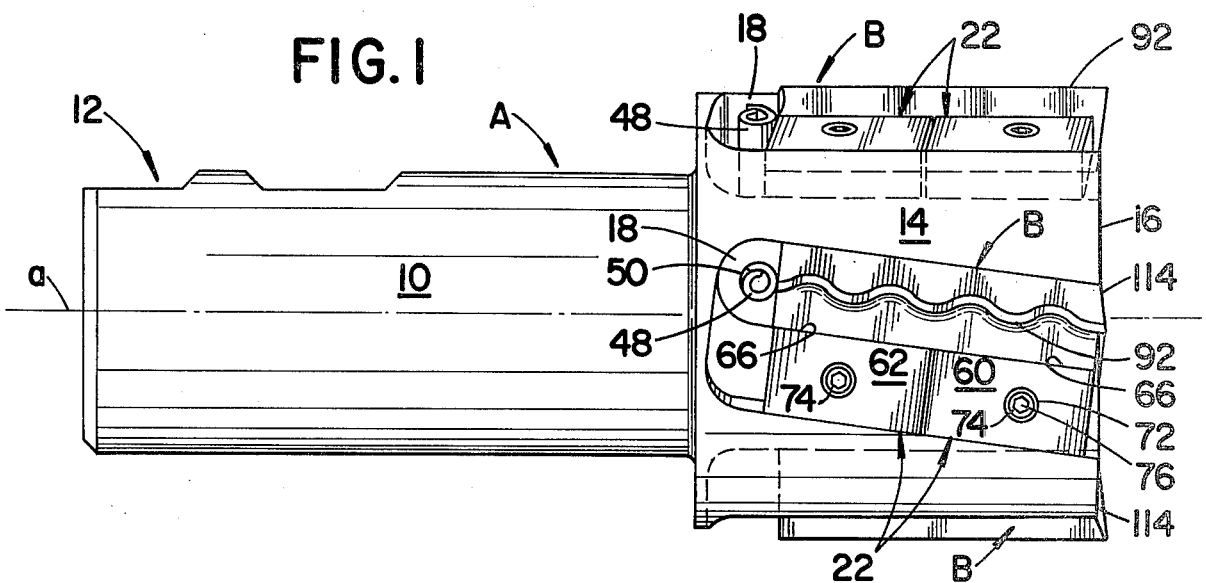
FIG. 1 is a side elevational view showing the subject new cutting tool assembly.

Referring now to the drawings wherein the showings are for purposes of illustrating the preferred and alternative embodiments of the invention only and not for purposes of limiting same, the FIGURES show an inserted blade type end mill comprised of a tool holder body A having a plurality of cutting inserts B disposed therearound. Although the invention is described hereinafter with reference to an end mill design, it will be appreciated by those skilled in the art that the overall concepts are equally applicable to other types of cutters.

Figures 2, 3:
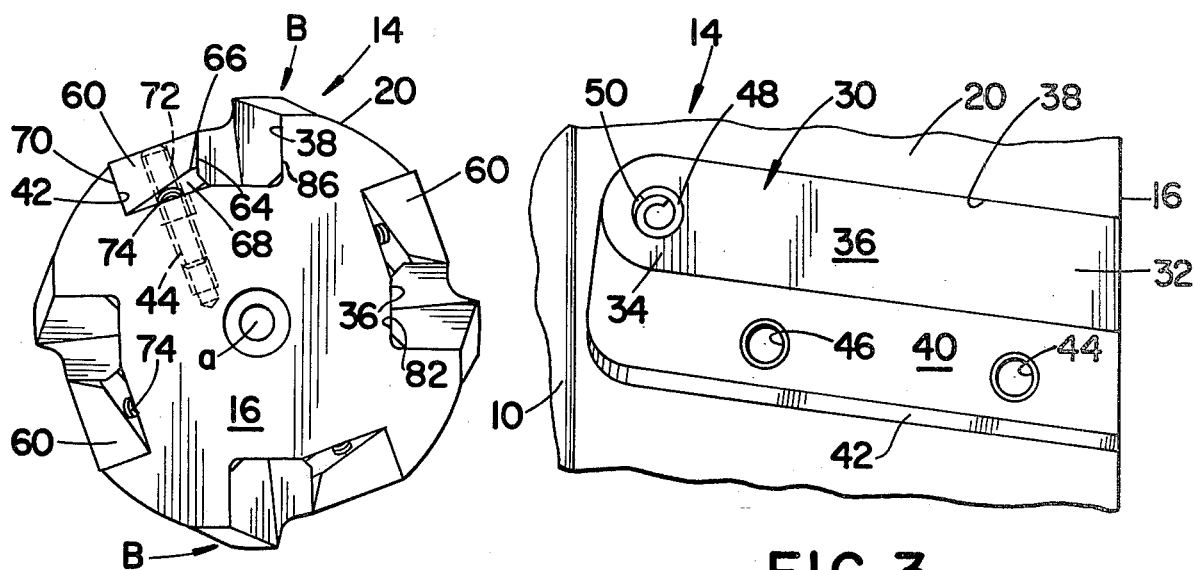
FIG. 2 is an end view of the assembly shown in FIG. 1.
FIG. 3 is a partial side elevational view of a portion of the tool holder of FIG. 1 with the tool insert removed for ease of illustration.

With particular reference to FIGS. 1 and 2, tool body A is comprised of an elongated mounting or shank portion 10 having a longitudinal axis a. The tool body is adapted to be conventionally affixed at end area 12 in the spindle of a milling machine or the like. A cutting insert holding portion 14 is disposed axially adjacent shank 10 and includes outermost end 16. A plurality of cutter insert receiving and locating areas generally designated 18 are located at spaced intervals around the substantially cylindrical peripheral face 20 of insert holding portion 14. Insert retaining means generally designated 22 are associated with receiving and locating areas 18 for providing convenient means to retain cutting inserts B in position on tool body A.

Figure 4:
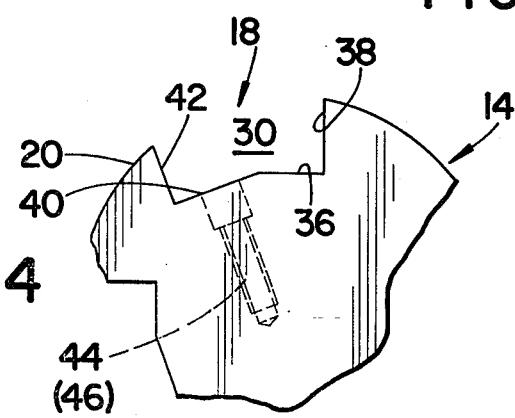
FIG. 4 is an end view of the structure shown in FIG. 3.

FIGS. 3 and 4 show one of the insert receiving and locating areas 18 which will hereinafter be described in detail. In the preferred arrangement under discussion, four identical receiving and locating areas 18 are equidistantly spaced around peripheral face 20. However, it will be appreciated that a greater or lesser number could be employed depending upon the overall tool diameter and/or the particular machining operation to be performed. As shown, receiving and locating area 18 comprises an elongated groove 30 extending from an outer end area 32 to an inner end area 34 which has a generally arcuate configuration. The groove has a bottom wall 36 and a side wall 38 disposed generally normal thereto. To position the insert cutting edges along a preferred 7° axial rake relative to longitudinal axis a, and because of the particular structural configuration of inserts B as will be described hereinafter, side wall 38 itself is disposed at an angle of 7° relative to axis a. A portion of the bottom wall as at 40 tapers downwardly and terminates in a side wall 42 disposed generally normal thereto. Although the amount of taper of portion 40 relative to bottom wall 36 may vary, the preferred arrangement contemplates a taper angle of approximately 20°.

A pair of spaced apart threaded openings 44, 46 extend inwardly into portion 14 from portion 40 for releasably mounting insert retaining means 22 in locating groove 30. For reasons which will subsequently become apparent, the threaded openings 44, 46 have right hand threads. Bottom wall 36 and bottom wall portion 40 are slightly back tapered, that is, they taper slightly into tool holder portion 14 over the longitudinal extent thereof from end area 32 toward end area 34 for accommodating the tool insert cutting edge in a desired manner. In the preferred arrangement where the cutting edges have a 7° axial rake along tool holder portion 14 and a constant radial disposition relative to longitudinal axis a, this taper is approximately equal to 0° 39′. It will be appreciated, however, that this taper may vary to accommodate alternative arrangements and cutting edge dispositions.

In the preferred embodiment, a conventional roll pin 48, is received in opening 50 in bottom wall 36 adjacent innermost end area 34 for precisely locating the associated cutting tool insert B axially within groove 30.

Referring again to both FIGS. 1 and 2, an insert retaining means 22 is associated with each receiving and locating area 18. As these retaining means are identical to each other for each area 18, description will hereinafter be made with reference to only one of them. More particularly, insert retaining means 22 is comprised of a pair of wedge blocks 60, 62. Each of these blocks includes a wedge surface 64 tapering inwardly from the innermost upper or top edge 66 toward a bottom 68. As best shown in FIG. 2, edge 66 positively engages the associated one of cutting inserts B. Bottom 68 tapers from wedge surface 64 to side 70 with both wedge blocks 60, 62 dimensioned so that side 70 will be received closely adjacent side wall 42 of locating groove 30. Bottom 68 is also spaced from portion 40 to allow selective adjustment of the wedge block wedging action against the associated insert. The edge defined by the intersection of bottom 68 and 70 acts as a pivot at the area of intersection between wall portion 40 and side wall 42. Each wedge block 60, 62 includes a threaded opening 72 extending therethrough and adapted for registry with threaded openings 44, 46 in bottom wall portion 40. In the preferred arrangement, these openings have a left hand thread.

With continued reference to FIGS. 1 and 2, a pair of threaded members 74 are employed to fixedly mount wedge blocks 60, 62 in groove 30. The lower half of members 74 have a right hand thread for threaded receipt in openings 44, 46 and the upper half of members 74 have a left hand thread for threaded receipt of openings 72. Further, each member 74 includes a socket 76 at the uppermost end for receiving a conventional wrench to facilitate selective adjustment thereof. As will be appreciated, the oppositely threaded portions on threaded members 74 facilitate quick adjustment for the wedge blocks between released and wedging conditions.

With reference to FIGS. 5–8, description will hereinafter be made to one of the cutting inserts B, it being appreciated that the other inserts are identical thereto unless otherwise specifically noted. In the preferred arrangement, each insert B is formed from carbide in a configuration which simplifies production and produces better overall operational results. That is, insert blanks of the preferred form are easily manufactured by known techniques and subsequently master ground to define the desired cutting edge. In fact, the subject arrangement simplifies manufacture as compared to similar high-speed steel cutters where the cutting edges are integrally formed with the cutter body. Also, carbide inserts allow the tool to be operated 7 to 8 times as fast as the prior high-speed steel tools. While use of four inserts B are shown in the FIGURES, the overall cutting tool assembly can be designed to accommodate a greater or lesser number of inserts.

Insert B includes a body 80 having a flat bottom surface 82 and a longitudinal axis generally designated b in FIG. 6. A pair of parallel, spaced side faces 84, 86 extend upwardly from bottom surface 82 and are substantially normal thereto. An end area 88 extends transversely across the bottom surface between side faces 84, 86 and normal thereto. End area 90 is spaced from end area 88 and extends across the bottom surface between side faces 84, 86. As best shown in FIGS. 5 and 8, the area of intersection between bottom surface 82 and side faces 84, 86 are beveled over the lengths thereof.

A cutting edge 92 is defined by the intersection of a cutting face 94 and a land area 96. It extends substantially longitudinally of body 80 and generally parallel to side faces 84, 86. The cutting face includes a plurality of alternating arcuate peak areas 98 and valley areas 100. The peak areas extend outwardly from the cutting face while the valley areas extend thereinto. As best shown in FIG. 7, cutting edge 92 lies in a plane generally parallel to the plane of bottom surface 82. However, it is possible to have the plane which contains the cutting edge 94 inclined slightly relative to bottom surface 82 to accommodate a different type of mill design or to achieve a different cutting action. Other dimensional and spacial relationships between the cutting edge and insert bottom surface, side walls and end areas are similarly possible without departing from the overall intent or scope of the present invention.

As viewed in FIGS. 5 and 6, cutting edge 92 has a generally sinusoidal configuration over the length thereof between end areas 88, 90 in the surface of cutting face 94. In the preferred arrangement under discussion, the radii of peak areas 98 are greater than the radii of valley areas 110 with the peak and valley areas extending laterally across the cutting face generally normal to bottom surface 82.

In the subject embodiment the peak portions have a radius of approximately 0.187 inches and the valleys have a radius of approximately 0.125 inches. The pitch or distance between adjacent peaks is approximately 0.375 inches and the peak to valley dimension or depth is approximately 0.050 inches. These dimensions are preferred for most operations but could obviously be varied depending upon many factors.

Moreover, cutting face 94 is preferably disposed relative to bottom surface 82 in a manner defining a neutral rake angle when the insert is mounted in tool body A. By conventional definition, the rake angle is neutral when the cutting face surface lies on a radial line which, if extended toward tool holder axis a would pass through the axis. The specific preferred relationship between the cutting face and bottom surface of the subject insert will become apparent hereinafter.

With continued reference to FIGS. 5 and 6, it will be seen that land area 96 comprises a thin band-like area having a generally sinusoidal configuration somewhat commensurate with that of cutting edge 92 in the surface of cutting face 94. As shown in FIG. 8, land area 96 tapers slightly from the cutting edge toward the bottom surface and, in the preferred embodiment here under discussion, this taper angle is approximately equal to 5°.

As best shown in FIGS. 5, 6 and 8, a connecting wall 110 extends between the lowermost portion of cutting face 94 and side face 84. The interconnection between this connecting wall and the cutting face is radiused with the connecting wall then tapering over its lateral extent toward bottom surface 82 from cutting face to side face. In the preferred arrangement, this taper is in the range of approximately 10°.

As best seen in FIGS. 6 and 8, a clearance surface 112 extends from land area 96 to side face 86 and also tapers from the land area toward bottom surface 82 over the lateral extent thereof. In the preferred arrangement, this taper angle is greater than the taper of the land area itself and is generally in the range of 20°.

As best seen in FIGS. 5, 6 and 7, end area 90 includes a first end portion 114 extending generally axially outward from insert body 80. Cutting edge 92 and cutting face 94 also extend generally axially outward of the tool insert body at this area (FIGS. 5 and 7) for defining first end portion 114. This first end portion defines a plane which tapers (FIG. 6) at a first angle 116 from the outermost end 118 of the cutting edge end 118 back toward bottom surface 82. In the preferred embodiment where the cutting edge is disposed at a 7° axial rake the first angle is generally in the range of 13°–15° and the second angle is generally in the range of 6°–8° (measured between a plane disposed transverse and normal to bottom surface 82 and the plane of first end portion 114). Preferably, however, first angle 116 is substantially equal to 14° and second angle 120 is substantially equal to 7°. Angles 116 and 120 provide the necessary clearance and cutting edge areas to accommodate the desired end milling operation. Of course, these angles may be varied as deemed necessary and/or appropriate for accommodating different orientations of the insert cutting edge on the tool body as well as other types of cutting or material removal applications.

In order to achieve the above noted neutral rake angle, cutting face 94 tapers (FIG. 8) over the length thereof between end areas 88, 90 toward side face 86 from cutting edge 92 to define a cutting face taper angle 122. In the preferred embodiment, this taper angle is approximately 5° 19' relative to a plane extending longitudinally along the insert body normal to bottom surface 82. It will be appreciated, however, that angle 122 may vary somewhat to maintain the neutral rake and accommodate other possible design parameters which may be incorporated into the insert and/or tool body.

With the above description of the individual components involved and referring again to FIGS. 1 and 2, description will hereinafter be made with reference to certain benefits derived from the subject invention. First, the individual cutting tool inserts B are easily mounted to tool holder A by means of receipt thereof in locating grooves 30. Positive axial positioning for the inserts is obtained therein by engagement between insert end areas 88 and locating pins 48. Substantially flat insert bottom surface 82 then rests on flat locating groove bottom wall 36. When wedge blocks 60, 62 are moved into wedging positions with the inserts by means of advancing threaded members 74, a portion of wedge surfaces 64 engage insert side faces 84 and urge them into a position where insert side faces 86 positively engage locating groove side walls 38.

Because of the wedge block configurations, the inserts are fixedly retained in position on holder portion 14. Due to the parallel relationships between insert side faces 84, 86 and cutting edge 92, and further because of the 7° angular disposition of locating groove side wall 30 relative to longitudinal axis a, cutting tool inserts B will be disposed so that the cutting edges form a 7° axial rake over a longitudinal portion of the tool body.

As will be particularly seen in FIG. 1, the relative location of locating pins 48 and the axial length of the insert bodies are such that insert end portions 114 protrude axially from outer end 16 to facilitate end milling operations. Moreover, since the cutting edges are parallel to insert bottom surfaces 82, the approximately 0° 39' taper of groove bottom walls 36 compensates for the 7° axial rake imparted to cutting edges 92 so that the cutting edges have a constant radial cutting dimension over the lengths thereof from axia a. It should be particularly noted that the straight line configurations of cutting edges 92 define straight helixes over the lengths thereof relative to tool holder portion 14.

In the preferred embodiment, the inserts B are of identical configuration with the sinusoidal edge configurations also being of identical shape. The inserts are preferably positioned in the holding portion 14 so that the peak and valley portions of each cutting face 94 are in circumferential alignment. While an offset relationship as will be described with reference to FIG. 9 can be employed, the aligned relationship is preferred since it does require only one insert style. This simplifies manufacture, reduces insert inventory requirements and eliminates problems with insert replacement.

Because inserts B of the subject development are preferably constructed of carbide, the assembly may be operated at higher cutting speeds than is permissible with conventional high-speed steel cutting tools. Indeed, and when constructed from carbide, the subject cutting edge configuration facilitates approximately 7 to 8 times greater stock removal per minute than prior cutters constructed from high-speed steel. The sinusoidal cutting edge configuration in the surface of cutting face 94 is such that during a cutting operation, the workpiece chips are discontinuous and relatively short. As the cutting edges become worn or otherwise damaged and require sharpening or replacement, the inserts are easily removed from the tool holder by means of the mechanical wedging arrangement. As the cutting edges are resharpened, the inserts may be shimmed outwardly in order to retain the same dimensional characteristics. This allows the inserts to be ground several times by conventional cutter grinding means and provides additional tool life. Due to the cutting edge configuration and the insert construction, the subject cutter is especially useful in rough cutting operations where it is desired to effect maximum material removal and also achieve a relatively smooth surface finish in the range of 200 microinches.

One structural alternative which can be employed when practicing the subject invention is schematically shown in FIG. 9. In this FIGURE, a pair of adjacent, that is, consecutive ones of the cutting edges 92a, 92b are shown superimposed on each other in plan view. As will be noted, the sinusoidal areas in the two cutting edges are slightly offset from each other so that the peak area of one cutting edge generally correspond to the valley areas of the other cutting edge. They are shown offset as being offset from each other by an amount approximately equal to ½ the radius of the peak areas.

With the inserts B shown in FIGS. 1 and 2, the cutting edge of each insert is offset from the cutting edge of adjacent tool inserts in the manner schematically depicted in FIG. 9. Thus, the diametrically opposed inserts shown in FIG. 2 will have the same cutting edge configuration insofar as the sinusoidal portion thereof is concerned. However, as viewed in a direction normal to the plane of the insert cutting faces, cutting edges 92a, 92b will have a substantially straight line configuration in substantially the same manner as more conventional milling cutters.

FIG. 10 shows an end view of an alternative arrangement. Here, like components are identified by like numberals with a prime (') suffix and new components are identified by new numerals. One of the tool inserts has been removed from the tool holder for ease of illustration.

In FIG. 10, it is contemplated that holder portion 14' of tool holder A' has a smaller diameter than the corresponding tool holder portion 14 in the preferred embodiment of FIGS. 1–4. Here, locating grooves 140 are simply machined into the tool holder portion to include a bottom wall 142 generally corresponding in disposition to bottom wall 36 in the preferred embodiment and a side wall 144 generally corresponding in disposition to side wall 38 in the preferred embodiment. Tool inserts B' are situated in locating grooves 140 so that insert bottom surface 82' rests on groove bottom wall 142 and insert side face 86' engages groove side wall 144. In this embodiment, the inserts are affixed to the tool holder by convenient means such as brazing or the like.

The invention has been described with reference to a preferred and alternative embodiment. Obviously, modifications and alterations will occur to others upon the reading and understanding of this specification. It is my intent to include all such modifications and alterations insofar as they come with the scope of the appended claims or the equivalents thereof.

I claim:

1. A cutting tool insert adapted for mounting on a cutting tool holder in a manner such that a cutting edge on said insert extends radially outward of said tool holder over a longitudinal extend thereof, said insert comprising:

an insert body having a longitudinal axis, a substantially flat bottom surface adapted to locate said insert in a desired position on said tool holder and a cutting edge spaced from and extending generally logitudinally of said bottom surface, said cutting edge being defined by the intersection of a cutting face and a land area which tapers from said cutting edge toward said bottom surface with said cutting face disposed to define a neutral rake angle when said insert is mounted on a tool holder, said cutting edge having a substantially straight line configuration over the length thereof as viewed in a direction normal to said cutting face with said cutting face including a plurality of alternating arcuate peak areas extending outwardly therefrom and arcuate valley areas extending inwardly thereinto substantially laterally thereacross for defining a generally sinusoidal cutting edge configuration along the surface of said cutting face, and said peak areas having a radius greater than the radius of said valley areas at least at said cutting edge, said insert body includes a pair of opposed side faces and a pair of opposed end face areas upstanding from said bottom surface, said insert body further having a connecting wall extending between said cutting face and one of said side faces at an area spaced from said cutting edge toward said bottom surface, said cutting face and cutting edge extend axially outward from said insert body at one of said end areas, said one end area including a first end portion defining a plane which at a first angle from the outermost end of said cutting edge back toward the other of said side faces and at a second angle from said cutting edge outermost end back toward said bottom surface, said first angle being greater than said second angle when measured between a plane disposed transverse and normal to said bottom surface and the plane of said first end portion.

2. The insert as defined in claim 1 wherein said first angle is generally in the range of 13°–15° and said second angle is generally in the range of 6°–8°.

3. The insert as defined in claim 2 wherein said first angle is approximately 14° and said second angle is approximately 7°.

4. A cutting tool assembly comprising in combination:

a tool holder body having a longitudinal axis, a mounting portion adapted for selectively mounting said holder body to drive means for rotation about said axis and a cylindrical tool holder portion disposed axially adjacent said mounting portion and terminating in an outermost end;

a plurality of cutting tool inserts affixed to said tool holder portion at spaced intervals therearound in a manner such that a cutting edge on each insert is spaced radially outward of said tool holder portion over a longitudinal section thereof, each of said cutting tool inserts having a substantially flat bottom surface and an insert logitudinal axis with said cutting edge spaced from said bottom surface and extending generally logitudinally of said insert, said cutting being defined by the intersection of a cutting face establishing a rake angle relative to said tool holder portion and a land area tapering from said cutting edge toward said bottom surface, said cutting face including a plurality of alternating arcuate peak areas extending outwardly therefrom and valley areas extending inwardly thereinto laterally across said cutting face for defining a generally sinusoidal cutting edge configuration along the surface of said cutting face, said cutting edge having a substantially straight line configuration as viewed in a direction normal to said cutting face;

means for precisely locating each of said tool inserts at said spaced apart intervals around said tool holder portion such that said insert body cutting edges are disposed in straight helixes relative to the tool holder longitudinal axis; and, means for fixedly retaining each of said tool inserts on said tool holder portion, each tool insert includes parallel opposed side faces substantially normal to said bottom surface, a pair of end areas and a connecting wall extending between the lowermost area of said cutting face and one of said faces, wherein the cutting face and cutting edge of each tool insert axially outward from one of said end areas and outwardly from said tool holder portion outermost end, said one end area including a first end portion defining a plane which tapers at a first angle from the outermost end of said cutting edge back toward the other of said side faces and at a second angle from said cutting edge outermost end back toward said bottom surface, said first angle being greater than said second angle when measured between a plane disposed transverse and normal to said bottom surface and the plane of said first end portion.

5. The combination as defined in claim 4 wherein said first angle is approximately 14° and said second angle is approximately 7°.

* * * * *